United States Patent

Pfeifer et al.

[15] 3,649,120

[45] Mar. 14, 1972

[54] MICROFILM COPYING CAMERA

[72] Inventors: Joseph Pfeifer, Unterhaching; Horst Bickl, Munich, both of Germany

[73] Assignee: Agfa-Gevaert AG, Leverkusen, Germany

[22] Filed: Apr. 6, 1970

[21] Appl. No.: 26,040

[30] Foreign Application Priority Data

Apr. 5, 1969    Germany ........................ P 19 17 698.8

[52] U.S. Cl. ............................................. 355/68, 355/63
[51] Int. Cl. ...................................................... G03b 27/76
[58] Field of Search ..................... 355/55, 63, 64, 67, 68, 69, 355/70, 71; 95/10 C

[56] References Cited

UNITED STATES PATENTS

| | | | |
|---|---|---|---|
| 2,484,299 | 10/1949 | Labrum | 355/68 X |
| 3,011,396 | 12/1961 | Szymczak | 355/68 X |
| 3,402,635 | 9/1968 | Jacknau et al. | 355/64 |
| 3,402,636 | 9/1968 | Gemmer et al. | 355/68 |

FOREIGN PATENTS OR APPLICATIONS 1,173,329    7/1964    Germany ................................ 355/68

*Primary Examiner*—Joseph F. Peters, Jr.
*Attorney*—Arthur O. Klein

[57] ABSTRACT

A microfilm copying camera of the step-by-step type which permits adjustment of the ratio of the size of the picture to be taken (the copy) to the size of the picture to be copied (the master or original). The camera is provided with a light source of controllable intensity for illuminating the entire master; the light source is controlled by a photometer mounted on the camera and scanning a small test area of the master. The camera has an adjustable lens board, whereby the size of the copy may be varied. The photometer has a light sensitive element mounted in the plane of the camera film, and a lens which scans the test area which is mounted on the camera lens board and has a focal length equal to the focal length of the camera lens. The camera may have a shutter mechanism with a fixed opening and a constant exposure time, the only variable in the taking of the picture then being the variable illumination provided by the controlled light source.

10 Claims, 3 Drawing Figures

INVENTORS:
JOSEF PFEIFER
HORST BICKL

BY:
Arthur O. Klein
their Attorney

MICROFILM COPYING CAMERA

This invention relates to a microfilm camera device with a camera provided on an adjustable carrier, said camera having an adjustable lens board whereby the entire master may be copied with a desired reproduction ratio. In the apparatus shown, the camera is a step-by-step camera provided with a fixed aperture and with a shutter which operates at a uniform speed. The only variable in the taking of a picture is the intensity of the illumination of the master. This is under the automatic control of a photometer which scans a limited area of the master and varies the illumination thereof accordingly.

In known devices of this kind, the photometer includes a photoelectric cell fixedly arranged above the master; changes of the intensity of light received at the focal plane of the camera cannot be measured when the adjustment of the lens board of the camera is changed to provide different sizes of reproductions. In other known devices the intensity of light received at the focal plane of the camera is measured; no measuring of such light intensity or regulation of the light source can be made, however, while a picture is being taken. Such last known arrangement, therefore, prevents the correction of variations in light received at the focal plane, as by reason of changes in the voltage of the power supply, during the taking of the picture.

In accordance with this invention, the camera has an adjustable lens board, whereby the size of the copy may be varied. The photometer has a light sensitive element, such as a photoelectric cell, mounted in the plane of the camera film, and a lens which scans the test area which is mounted on the camera lens board and has a focal length equal to the focal length of the camera lens. Accordingly, both lenses, that of the camera and that of the photometer, are adjusted together. Preferably the axis of the photometer parallels the axis of the camera lens.

With this arrangement, the density of light in the field scanned by the photometer corresponds exactly to the strength of light received within the camera at the focal plane. The measuring of such light, and the regulation of the light source for the master, can take place immediately before or during the taking of the picture. Furthermore, the size of the measuring field projected onto the original remains in an invariable proportion to the size of the picture to be made independently of the reduction factor. A suitable size of the measuring field in relation to the size of the picture to be made, for example, one percent of this surface, once chosen remains the same for all reduction scales.

In a preferred embodiment of the invention, the camera and the photoelectric cell are arranged on a common adjustable carrier which is provided opposite the plane of the master to be copied. With such arrangement a particularly simple design of the step-by-step type camera device is obtained in which there is a precise coordination between measuring objective and camera objective. In such embodiment there is also employed a shutter limiting the measuring field, such shutter being arranged in the focal plane of the measuring objective.

In the accompanying drawing, which shows a preferred but non-limiting embodiment of the invention:

Figure 1:
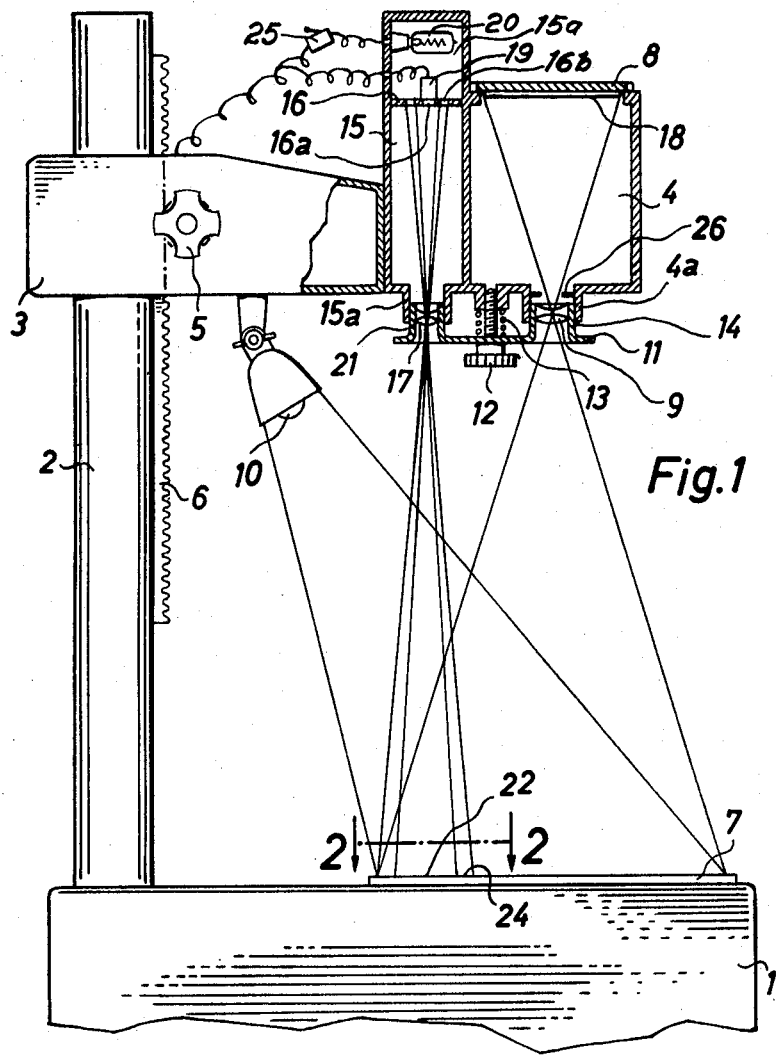
FIG. 1 is a view partially in side elevation and partially in vertical section through a step-by-step type camera device.

From a horizontal support 1 for an original or master 7 to be copied there extends a vertical column 2 on which a horizontal supporting arm 3 for copying camera 4 is slidingly mounted. The supporting arm can be adjusted in height, to change the reduction ratio, by means of a handwheel 5 connected to a pinion (not shown) which meshes with a vertical rack 6 affixed to column 2. The adjusting means 5, 6, etc., may be provided with a conventional locking means, not shown.

The somewhat schematically shown camera 4 has a light-tight body provided with a vertical central lower tubelike extension 4a which slidingly and light-sealingly receives a lens barrel 14 carrying a picture-taking objective lens 9. A shutter 26 is shown mounted in extension 4a behind the lens 9' it is to be understood that other types of shutters may be used. The shutter may also incorporate an adjustable diaphragm; ordinarily, in making photocopies by use of apparatus in accordance with the invention, the diaphragm aperture and the shutter speed are maintained constant from picture to picture, only the intensity of illumination of the original being varied. The film 18 upon which the original 7 is to be copied is shown as being supplied and held by a film magazine 8. The original 7 is illuminated by an electric lamp 10 in a suitable reflector. The intensity of illumination of original 7 may be varied manually in accordance with the reading of an illumination testing device or photometer, or it may be automatically controlled by the photometer, as in the embodiment shown.

The illumination testing device has a chamber 15 fixedly attached to the body of the camera 4, the lower end 15a of chamber 15 is formed as a vertical tubelike extension or barrel, which slidingly and light-sealingly receives a lens barrel 21 carrying an objective lens 17. The optical axis of lens 17 is vertical, as is that of lens 9. The lens barrel 21 is formed as a part of a lens board member 11, as is the barrel 14 carrying the lens 9. The lenses 9 and 17 are of the same focal length; they are adjusted simultaneously and in the amount by a setscrew 12 provided with a thumb knob, the screw passing freely through the lens board 11 between lens barrels 14 and 21, and being threaded into the bottom wall of camera 4. A coil compression spring 13 telescoped about setscrew 12 and interposed between the wall of the camera and the lens board 11 constantly urges the lens board into its lower position as determined by the adjustment of screw 12.

At the upper end of the photometer chamber 15 proper there is disposed a horizontal plate 16 the upper surface of which is disposed substantially in the plane of film 18, that is, at the focal plane of lens 17. Above a central circular hole 16a through plate 16, which functions as a diaphragm, there is fixedly mounted a photoelectric cell 19 which measures the intensity of illumination of a circular field 22 on original 7, such field being defined by the hole 16a in plate 16. It will be apparent that since lens 9 and 17 have the same focal length, and that since the film 18 and the upper surface of plate 16 are positioned in the same horizontal plane, during the vertical focusing of the camera lens 9 the light-measuring lens 17 is simultaneously and automatically focused.

The apparatus shown includes means whereby the operator may readily see the position of the test field 22 on the original or master 7. Rising above chamber 15 is a further chamber 15a which forms an extension of chamber 15 but is divided from it by the plate 16. An electric lamp 20 is mounted in a suitably positioned socket in chamber 15a; the plate 16 is provided with an arcuate slot 16b coaxial of central hole 16a, slot 16b being continuous except for a plurality of thin, angularly spaced radial struts, not shown, which are necessary to support the central portion of plate 16 and the photoelectric cell 19. The lamp 20 throws light downwardly through the slot 16b downwardly to form a substantially continuous circular lighted ring or band 24 surrounding the test field 22 on the original 7. Usually lamp 20 is switched off before the picture is taken, since otherwise the area of band 24 would be more brightly illuminated than the remainder of the original. For this purpose there may be provided a manually operated switch 25 in the circuit which energizes lamp 20. In the illustrative automatic control mechanism for lamp 10, schematically shown in FIG. 3 and now to be described, there may be means (not shown) for automatically turning off lamp 20 before each picture is taken.

Figure 2:
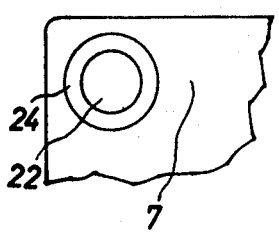
FIG. 2 is a fragmentary view in plan of an original or master about to be photographed.

The automatic control mechanism for lamp 10 shown herein in block form, is that disclosed in FIG. 2 of the co-assigned U.S. Pat. to Gemmer et al., No. 3,402,636, Sept. 24, 1968. The major parts of such control mechanism are designated with the same reference characters as those used in the patent with added primes.

Figure 3:
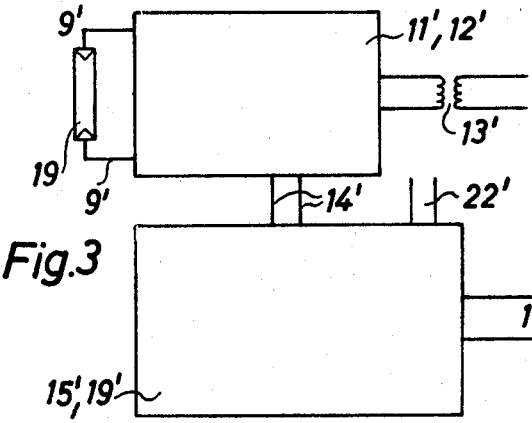
FIG. 3 is a block type diagram of a circuit for controlling the intensity of the illuminating lamp by the photometer.

The photoelectric cell 19 is a photoresistance. Cell 19 is connected to unit 11', 12', which includes a transistor amplifier, by wires 9'; unit 11', 12' also includes a rectifier 12' which is connected to an electrical power source 13'. Output wires 14' from unit 11', 12' are connected to a unit 15', 19' which includes a phase control circuit 15' and a pair of silicon controlled rectifiers 19'. The lamp 10 shown in FIG. 3 is a fluorescent lamp, which is fed by current from an electric power source 22' through a choke coil (not shown) as triggered by the unit 15', 19'.

Although the invention is illustrated and described with reference to one preferred embodiment thereof, it is to be understood that it is in no way limited to the disclosure of such a preferred embodiment but is capable of numerous modifications within the scope of the appended claims.

What is claimed is:

1. In a camera having a support for an original to be copied, a camera, means supporting the camera for adjustment toward and away from the support for the original, the camera having means supporting a film to be exposed in the focal plane of the camera, a focusing lens on the camera adjustable toward and away from the focal plane of the camera, and means for illuminating the original, the improvement which comprises a photometer which is directed toward and receives light from the original, said photometer reading the intensity of illumination of a portion of the original, means mounting the photometer for adjustment toward and away from the support for the original simultaneously with and through the same distance as the camera, the photometer having a chamber with an objective lens of the same focal length as the camera lens, a photosensitive element in the photometer chamber positioned in the focal plane of the camera, and means maintaining the photometer lens and the camera lens at equal distances from the support for the original and simultaneously adjusting the photometer lens and the camera lens with respect to the photosensitive element and the film, respectively, whereby said photometer provides a measurement of the intensity of the illumination of the original which is independent of the ratio of the size of the copy to be made with respect to the size of the original.

2. A camera according to claim 1, wherein the optical axes of the lens of the photometer and camera are parallel.

3. A camera according to claim 1, comprising a common support for the camera and photometer adjustable toward and away from the support for the original.

4. A camera according to claim 1, comprising a common lens board mounting the camera and photometer lenses, and means for adjusting the lens board to focus said lenses.

5. A camera according to claim 1, comprising circuit means responsive to the photosensitive element of the photometer for adjusting the degree of energization of the means for illuminating the original.

6. A camera according to claim 5, wherein the camera has a diaphragm set at a fixed aperture and a shutter which operates at a fixed speed.

7. A camera according to claim 1, comprising a diaphragm in the photometer chamber for defining the limits of the test area of the original which is scanned by the photometer.

8. A camera according to claim 7, wherein the diaphragm is disposed immediately in advance of the photosensitive element.

9. A camera according to claim 8 wherein the photometer chamber has side walls, the diaphragm is a plate spanning and secured to the side walls of the photometer chamber, and the photosensitive element is supported on the plate.

10. A camera according to claim 9, comprising means providing a visible boundary of the test area of the original, comprising a second, separate source of light in an extension of the photometer chamber beyond the diaphragm plate therein, and a plurality of apertures in the diaphragm plate radially outwardly of the photosensitive element which pass beams of light from the second light source which substantially outline the test area on the original.

* * * * *